United States Patent
Lee et al.

(10) Patent No.: US 7,824,578 B2
(45) Date of Patent: Nov. 2, 2010

(54) ADDITIVES FOR NON-AQUEOUS ELECTROLYTES AND ELECTROCHEMICAL DEVICE USING THE SAME

(75) Inventors: Ho Chun Lee, Daejeon (KR); Tae Yoon Park, Daejeon (KR); Yong Su Choi, Cheongju-si (KR); Soo Jin Yoon, Gwangju-si (KR); Hong Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 991 days.

(21) Appl. No.: 11/521,780

(22) Filed: Sep. 15, 2006

(65) Prior Publication Data

US 2007/0059588 A1    Mar. 15, 2007

(30) Foreign Application Priority Data

Sep. 15, 2005    (KR)    ............. 10-2005-0086143

(51) Int. Cl.
*H01M 10/0567* (2010.01)
*H01M 10/05* (2010.01)
*H01M 6/16* (2010.01)

(52) U.S. Cl. ............. 252/500; 429/340; 429/330; 429/324; 429/326; 429/122

(58) Field of Classification Search ............ 429/188, 429/304, 314, 340–341, 324–326, 330–331; 252/182.1, 62.2, 500
See application file for complete search history.

(56) References Cited

U.S. PATENT DOCUMENTS

| | | | |
|---|---|---|---|
| 6,444,360 B2 * | 9/2002 | Gan et al. ............. | 429/215 |
| 2002/0197537 A1 | 12/2002 | Kim et al. | |
| 2003/0170548 A1 | 9/2003 | Otsuki et al. | |
| 2003/0190531 A1 | 10/2003 | Otsuki et al. | |

2004/0053138 A1    3/2004    Otterstedt et al.

(Continued)

FOREIGN PATENT DOCUMENTS

CN    1385919    12/2002

(Continued)

OTHER PUBLICATIONS

International Search Report dated Jan. 2, 2007 for Application No. PCT/KR2006/003677 (All references cited in search report are listed above).

(Continued)

*Primary Examiner*—Stanley Silverman
*Assistant Examiner*—Kallambella Vijayakumar
(74) *Attorney, Agent, or Firm*—Cantor Colburn LLP (57) ABSTRACT

Disclosed is an electrolyte for batteries, which comprises: (a) an electrolyte salt; (b) an electrolyte solvent; and (c) a sulfonate-based compound containing at least one electron withdrawing group (EWG) selected from the group consisting of a cyano group (—CN), an isocyanate group (—NCO), a thiocyanate group (—SCN) and an isothiocyanate group (—NCS). An electrode comprising the sulfonate-based compound or a chemical reaction product thereof, partially or totally formed on the surface thereof, and an electrochemical device comprising the electrolyte and/or the electrode are also disclosed. The electrochemical device using the sulfonate-based compound containing a cyano group, an isocyanate group, a thiocyanate group and/or an isothiocyanate group as an additive for electrolytes can provide significantly improved high-temperature lifespan characteristics.

12 Claims, 3 Drawing Sheets

U.S. PATENT DOCUMENTS

| | | |
|---|---|---|
| 2004/0197667 A1 | 10/2004 | Noh et al. |
| 2005/0089760 A1 | 4/2005 | Blasi et al. |

FOREIGN PATENT DOCUMENTS

| | | |
|---|---|---|
| CN | 1532986 | 9/2004 |
| EP | 1 109 244 A2 | 6/2001 |
| KR | 100450199 B1 | 9/2004 |
| KR | 1020050068665 A | 7/2005 |
| TW | 329566 | 4/1998 |
| TW | 200409397 | 6/2004 |
| TW | 200532963 A | 10/2005 |
| WO | 2005/027254 A1 | 3/2005 |

OTHER PUBLICATIONS

Gao Yang et al; "Recent development of electrolytes in lithium-ion rechargeable batteries"; Chinese Journal of Power Sources; vol. 27; No. 5; Oct. 2003; pp. 479-483.

Chinese Office Action for application No. 200680033865.1 dated Jul. 24, 2009.

* cited by examiner

ADDITIVES FOR NON-AQUEOUS ELECTROLYTES AND ELECTROCHEMICAL DEVICE USING THE SAME

This application claims the benefit of the filing date of Korean Patent Application No. 10-2005-0086143, filed on Sep. 15, 2005 in the Korean Intellectual Property Office, the disclosure of which is incorporated herein in its entirely by reference.

TECHNICAL FIELD

The present invention relates to an electrolyte for batteries comprising an additive for non-aqueous electrolytes capable of improving cycle characteristics and high-temperature characteristics of a battery. Also, the present invention relates to an electrode having improved thermal safety, and an electrochemical device, preferably a non-aqueous electrolyte secondary battery, comprising the same.

BACKGROUND ART

Recently, interests in energy storage technology have been gradually increased. As the use of batteries is enlarged to applications for the storage of energy for portable telephones, camcorders, notebook computers, personal computers and electric vehicles, efforts on the research and development of batteries are increasingly embodied. In this view, the field of electrochemical devices receives the greatest attention, and among them, interests in the development of chargeable/dischargeable secondary batteries are focused. More recently, in the development of such batteries, active studies have been conducted to design a novel electrode and battery, which provide an improved capacity density and specific energy.

Among secondary batteries which are now in use, lithium secondary batteries developed in the early 1990s are in the spotlight due to the advantages of higher drive voltages and far greater energy densities than those of conventional batteries, such as Ni—MH, Ni—Cd and sulfuric acid-lead batteries. However, such lithium secondary batteries have a problem in that their quality is degraded during repeated charge/discharge cycles. The above problem becomes more serious as the drive/storage temperature of a battery increases. Therefore, there has been a continuous need for a method of improving high-temperature lifespan characteristics of a non-aqueous electrolyte lithium secondary battery.

Korean Laid-Open Patent No. 0450199 and US Patent No. 2002-0197537 disclose a method of improving lifespan characteristics and high-temperature characteristics of a battery by using a sulfonate-based compound represented by the following Formula 2 as an additive for electrolytes:

[Formula 2]

wherein $R_1$ and $R_2$ each represent an alkyl group, an alkenyl group or an aryl group.

Additionally, Japanese Laid-Open Patent No. 2000-13304 discloses that a compound represented by the following Formula 3 can improve lifespan characteristics and storage characteristics of a battery:

[Formula 3]

wherein R represents an alkyl group.

As described above, sulfonate ($SO_3$)-based compounds have been already known to improve the quality of a battery when they are used as an additive for electrolytes.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

The inventors of the present invention have conducted many studies to improve the quality of a battery by using a sulfonate ($SO_3$)-based compound. Finally, the inventors of the present invention have discovered that when a sulfonate-based compound substituted with a specific substituent (for example, a sulfonate-based compound substituted with at least one substituent selected from a cyano group, an isocyanate group, a thiocyanate group and an isothiocyanate group) is used as an additive for electrolytes, it is possible to significantly improve lifespan characteristics and high-temperature stability of a lithium battery as compared to a conventional sulfonate-based compound having no substituent as described above.

Therefore, it is an object of the present invention to provide an electrolyte for batteries, which comprises a sulfonate-based compound having at least one of the aforementioned substituents, an electrode comprising the above compound on the electrode active material, and an electrochemical device comprising the electrolyte and/or the electrode.

According to an aspect of the present invention, there is provided an electrolyte for batteries, which comprises: (a) an electrolyte salt; (b) an electrolyte solvent; and (c) a sulfonate-based compound containing at least one electron withdrawing group (EWG) selected from the group consisting of a cyano group (—CN), an isocyanate group (—NCO), a thiocyanate group (—SCN) and an isothiocyanate group (—NCS). There is also provided an electrochemical device, preferably a lithium secondary battery, comprising the electrolyte.

According to another aspect of the present invention, there is provided an electrode comprising a sulfonate-based compound or a chemical reaction product thereof, partially or totally formed on a surface thereof, wherein the sulfonate-based compound contains at least one electron withdrawing group (EWG) selected from the group consisting of a cyano group (—CN), an isocyanate group (—NCO), a thiocyanate group (—SCN) and an isothiocyanate group (—NCS). There is also provided an electrochemical device, preferably a lithium secondary battery, comprising the electrode.

Hereinafter, the present invention will be explained in more detail.

The present invention provides an electrolyte characterized by comprising, as a constitutional element thereof, a sulfonate-based compound substituted with a specific substituent, for example, at least one substituent selected from a cyano group, an isocyanate group, a thiocyanate group and an isothiocyanate group.

Due to the above characteristics, the lithium secondary battery according to the present invention can realize excellent lifespan characteristics and high-temperature characteristics when compared to a battery using an electrolyte comprising a conventional non-substituted sulfonate-based compound having no substituent as described above. It is thought that the sulfonate-based compound substituted with at least one electron withdrawing group (EWG) provides more excellent effects as compared to other similar sulfonate-based compounds due to the following mechanism.

(1) In general, polymerization of compounds having alkenyl groups occurs while the compounds are electrochemically reduced or oxidized, resulting in the formation of a kind of polymer film. In fact, conventional sulfonate-based compounds having a sulfonate group (SO$_3$), an alkenyl group, or the like (KR 0450199 and US 2002-0197537, Formula 2) forms a polymer film on the surfaces of an anode and a cathode upon the first charge cycle. The polymer film serves as a passivation layer so that additives and an electrolyte cannot be decomposed any longer, thereby inhibiting side reactions between an electrode active material and an electrolyte solvent and structural collapse of an electrode, caused by co-intercalation of an electrolyte solvent into the electrode active material. Also, the polymer film functions sufficiently as a lithium ion tunnel, thereby minimizing degradation of the quality of a battery.

According to the present invention, the sulfonate-based compound having a sulfonate group (SO$_3$) and an alkenyl group is further substituted with an electron withdrawing group (EWG), such as a cyano group (CN), an isocyanate group (—NCO), a thiocyanate group (—SCN), or an isothiocyanate group (—NCS).

The sulfonate-based compound substituted with at least one EWG substituent shows a decreased reduction potential (an increased reduction potential in the case of a half cell) when compared to conventional sulfonate-based compounds substituted with an electron donating group (EDG) or non-substituted, and thus is decomposed with ease under a low initial voltage and show high reactivity with an anode. Therefore, when the sulfonate-based compound according to the present invention is used in an electrolyte, it is possible to improve the overall quality of a battery by the sulfonate-based compound to a sufficient degree. More particularly, the sulfonate-based compound can be decomposed upon the first charge cycle to form a firm and dense SEI film on the surface of an anode, thereby reducing the irreversible capacity of a battery. Ultimately, it is possible to improve the overall quality including capacity and lifespan characteristics of a battery.

It is thought that the reduction characteristics of a compound may be largely affected by the electronic effects in the compound. In other words, when a substituent introduced into the compound has electron donating ability, the compound has an increased electron density. Therefore, introduction of an electron donating group into an additive compound increases the reduction potential of the additive (decreases the reduction potential in the case of a half cell), and makes it difficult to perform reduction. On the other hand, when an electron withdrawing group (EWG) is introduced into a sulfonate-based additive compound as disclosed herein, the sulfonate-based compound has a decreased reduction potential (increased reduction potential in the case of a half cell), and makes it easier to perform reduction at an anode.

(2) Additionally, the substituents introduced into the sulfonate-based compound according to the present invention, such as a cyano group (—CN), an isocyanate group (—NCO), a thiocyanate group (—SCN), and an isothiocyanate group (—NCS), are electron withdrawing groups having a high dipole moment. The above substituents can form a strong bond with a transition metal, transition metal oxide, or a carbonaceous material, exposed on the surface of an electrode active material. Particularly, the substituents can form a stronger bond with the surface of an electrode active material at a high temperature of 45° C. or higher, thereby forming a complex-like protection layer. Hence, upon the first charge cycle of a battery, the sulfonate-based compound having at least one of the above substituents can form a passivation film while being adsorbed onto the surface of an electrode. As a result, the sulfonate-based compound according to the present invention forms a firm and dense film more easily when compared to a non-substituted sulfonate-based compound. Also, the resultant passivation film is strongly bound to the surface of an electrode active material, so that the passivation film can maintain its stability and structural integrity during repeated charge/discharge cycles, and thus can maintain the quality of a battery. The sulfonate-based compound according to the present invention can significantly improve cycle characteristics of a battery, particularly at a high temperature of 45° C. or higher.

One of the constitutional elements forming the electrolyte for batteries according to the present invention is a sulfonate-based compound. There is no particular limitation in the compound, as long as it is a sulfonate-based compound having at least one electron withdrawing group (EWG) selected from a cyano group (—CN), an isocyanate group (—NCO), a thiocyanate group (—SCN), and an isothiocyanate group (—NCS), Particularly, it is preferred to use the above sulfonate-based compound further containing an alkenyl group in order to arise a polymerization reaction while the compound is electrochemically reduced or oxidized.

The sulfonate-based compound may be represented by the following Formula 1:

[Formula 1]

wherein R$_1$ is a C2~C10 alkenyl; and

R$_2$ is a functional group selected from the group consisting of a C1~C10 alkyl group, alkenyl group, aryl group and phenyl group containing at least one substituent selected from a cyano group (—CN), an isocyanate group (—NCO), a thiocyanate group (—SCN) and an isothiocyanate group (—NCS).

The compound represented by Formula 1 has not only an alkenyl group but also an electron withdrawing group (EWG) such as a cyano group, an isocyanate group, a thiocyanate group or an isothiocyanate group. Hence, the compound is decomposed with ease under a lower initial voltage upon the first charge cycle to form a firm and dense SEI film on the surface of an anode. Also, the compound forms a kind of cathode protection film by forming a chemical bond between the above substituents and the surface of a cathode active material such as a transition metal or an oxide thereof, simultaneously with the formation of the SEI film. In other words, the compound donates non-shared electron pairs present in the above substituents to form a coordination bond, thereby forming a kind of complex-like protection film. Therefore, due to the protection films formed on both electrodes, it is possible to improve the quality of an anode related to lifespan characteristics and cycle characteristics, as well as the quality of a cathode related to high-temperature storage characteristics. As a result, it is possible to improve the overall quality of a battery and the safety of a battery at the same time.

Other sulfonate-based compounds having other substituents than the above substituents, which serve according to a functional mechanism similar to the above-described mechanism so as to improve the quality of a battery, are also included in the scope of the present invention.

Although the sulfonate-based compound may be used in an amount controlled to improve the overall quality of a battery, it is used preferably in an amount of 0.1~10 parts by weight based on 100 parts by weight of an electrolyte. If the compound is used in an amount less than 0.1 parts by weight, it is not possible to sufficiently improve the lifespan characteristics and high temperature characteristics of a battery. On the other hand, if the compound is used in an amount greater than 10 parts by weight, irreversible capacity increases so that the battery may be degraded in terms of its overall quality.

The electrolyte for a battery, to which the compound is added, comprises conventional components widely known to one skilled in the art, for example, an electrolyte salt and an organic solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof. A lithium salt is particularly preferred. Non-limiting examples of the lithium salt include $LiClO_4$, $LiCF_3SO_3$, $LiPF_6$, $LiBF_4$, $LiAsF_6$, $LiN(CF_3SO_2)_2$, and mixtures thereof.

The organic solvents that may be used in the present invention include conventional solvents known to those skilled in the art, such as cyclic carbonates and/or linear carbonates. Non-limiting examples of the organic solvents include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a mixture thereof. Halogen derivatives of the above organic solvents may also be used.

Additionally, the present invention provides an electrode comprising a sulfonate-based compound or a chemical reaction product thereof, partially or totally formed on the surface thereof, wherein the sulfonate-based compound contains at least one substituent selected from the group consisting of a cyano group, an isocyanate group, a thiocyanate group and an isothiocyanate group.

The electrode may be an anode comprising a solid electrolyte interface (SEI) film partially or totally formed on the surface thereof via electrochemical reduction of the above sulfonate-based compound; and/or a cathode comprising a complex-like protection film formed by chemical bonding between the surface of an electrode active material and at least one substituent selected from the group consisting of a cyano group, an isocyanate group, a thiocyanate group and an isothiocyanate group. If possible, protection films are preferably formed on the surfaces of both electrodes to improve the overall quality of a battery.

The electrode having a protection film on the surface of an anode and/or a cathode can be obtained by subjecting a battery using the above-described electrolyte to charge/discharge cycles, so that the EWG substituent (e.g. a cyano group, an isocyanate group, a thiocyanate group or an isothiocyanate group) of the sulfonate-based compound in the electrolyte forms a complex with the surface of the electrode active material in situ. In a variant, the sulfonate-based compound may be coated on the surface of an electrode active material or may be used in combination with other materials forming the electrode. In another variant, the sulfonate-based compound may be coated onto the surface of a preliminarily formed electrode.

When a battery comprises the electrode, on which a strong complex is formed via a chemical reaction between the sulfonate-based compound having at least one EWG substituent and a carbonaceous material, a transition metal or a transition metal oxide on the surface of the electrode active material, the carbonaceous material, transition metal or transition metal oxide in the electrode can be stabilized. Thus, the transition metal can be prevented from being partially dissolved out from the electrode active material during repeated charge/discharge cycles. Additionally, when any external physical impact is applied to the battery, it is possible to inhibit exothermic reactions caused by direct contact between the electrode surface and the electrolyte, and to retard a structural collapse of the electrode active material. Ultimately, it is possible to prevent the battery from igniting and exploding due to an increase in the internal temperature. Particularly, the EWG substituent-containing sulfonate-based compound more strongly protects the electrode surface at a high temperature of 45° C. or higher when compared to the protection at room temperature. Therefore, it is possible to provide an electrode having excellent thermal stability.

The electrode according to the present invention may be formed by applying an electrode active material on a current collector according to a method known to one skilled in the art. In one embodiment of such methods, an electrode slurry containing a cathode active material or an anode active material is applied onto a current collector, followed by drying. At this time, a small amount of conductive agent and/or binder may be added, as necessary.

Particularly, cathode active materials may include any conventional cathode active materials currently used in a cathode of a conventional electrochemical device. Particular non-limiting examples of the anode active material include: lithium transition metal composite oxides, including $LiM_xO_y$, (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium dioxide, molybdenum dioxide, etc.); or the like. Among these examples, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, a+b+c=1), $LiNi_{1-y}Co_yO_2$, $LiCo_{1-y}Mn_yO_2$, $LiNi_{1-Y}Mn_YO_2$ (wherein $0 \leq Y < 1$), $Li(Ni_aCo_bMn_c)O_4$ ($0 < a < 2$, $0 < b < 2$, $0 < c < 2$, $a+b+c=2$), $LiMn_{2-Z}Ni_ZO_4$, $LiMn_{2-Z}Co_ZO_4$ (wherein $0 < Z < 2$), $LiCoPO_4$, $LiFePO_4$ or a mixture thereof is particularly preferred.

Additionally, anode active materials may include any conventional anode active materials currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

As the binder, a currently used binder may be used. Particular non-limiting examples of the binder include PVDF (polyvinylidene fluoride) or SBR (styrene butadiene rubber).

Further, the present invention provides an electrochemical device comprising a cathode, an anode and an electrolyte, wherein the electrolyte comprises the sulfonate-based compound having the above EWG substituent; and/or either or both of the cathode and the anode comprise the sulfonate-based compound substituted with the above EWG substituent or a chemical reaction product thereof, partially or totally formed on a surface thereof.

The electrochemical device includes any device in which electrochemical reactions are performed. Particular examples of the electrochemical device include all kinds of primary batteries, secondary batteries, fuel cells, solar cells, capacitors, or the like. Preferably, the electrochemical device is a secondary battery, more preferably a lithium secondary battery, such as a lithium metal secondary battery, a lithium ion secondary battery, a lithium polymer secondary battery or a lithium ion polymer secondary battery.

The electrochemical device according to the present invention may be obtained by using a method generally known to one skilled in the art. For example, an electrode assembly is formed by using a cathode, an anode and a separator interposed between both electrodes, and then the electrolyte is injected thereto.

Preferably, the separator is a porous separator. Non-limiting examples of the separator that may be used include a polypropylene-based, polyethylene-based or polyolefin-based separator, or a porous separator, into which inorganic particles are incorporated.

There is no particular limitation in the outer shape of the electrochemical device obtained in the above-described manner. The electrochemical device may be a cylindrical, prismatic, pouch-type or coin-type device.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

1-1. Preparation of Electrolyte

1M $LiPF_6$ dissolved in a mixed solvent of EC:EMC (3:7) was used as an electrolyte, and the compound represented by the following Formula 4 was added to the electrolyte in an amount of 2.0 parts by weight:

[Formula 4]

1-2. Manufacture of Half Cell

Artificial graphite was used as a cathode and lithium metal foil was used as an anode to provide a coin-like half-cell in a conventional manner. To the half-cell, the electrolyte obtained as described in Example 1-1 was injected.

1-3. Manufacture of Full Cell

A cathode comprising $LiCoO_2$ and an anode comprising artificial graphite were used to provide a coin type cell in a conventional manner. To the full cell, the electrolyte obtained as described in Example 1-1 was injected.

EXAMPLE 2

An electrolyte, a half cell and a full cell were obtained in the same manner as described in Example 1, except that the compound represented by the following Formula 5 was added instead of the compound represented by Formula 4 in an amount of 2.0 parts by weight:

[Formula 5]

COMPARATIVE EXAMPLE 1~3

Manufacture of Lithium Secondary Battery

COMPARATIVE EXAMPLE 1

An electrolyte, a half cell and a full cell were obtained in the same manner as described in Example 1, except that the compound represented by the following Formula 6 was added instead of the compound represented by Formula 4 in an amount of 2.0 parts by weight:

[Formula 6]

COMPARATIVE EXAMPLE 2

An electrolyte, a half cell and a full cell were obtained in the same manner as described in Example 1, except that the compound represented by the following Formula 7 was added instead of the compound represented by Formula 4 in an amount of 2.0 parts by weight:

[Formula 7]

COMPARATIVE EXAMPLE 3

An electrolyte, a half cell and a full cell were obtained in the same manner as described in Example 1, except that the conventional electrolyte was used with no additive.

EXPERIMENTAL EXAMPLE 1

Determination of Reduction Potential of Sulfonate-Based Compound

Figure 1:
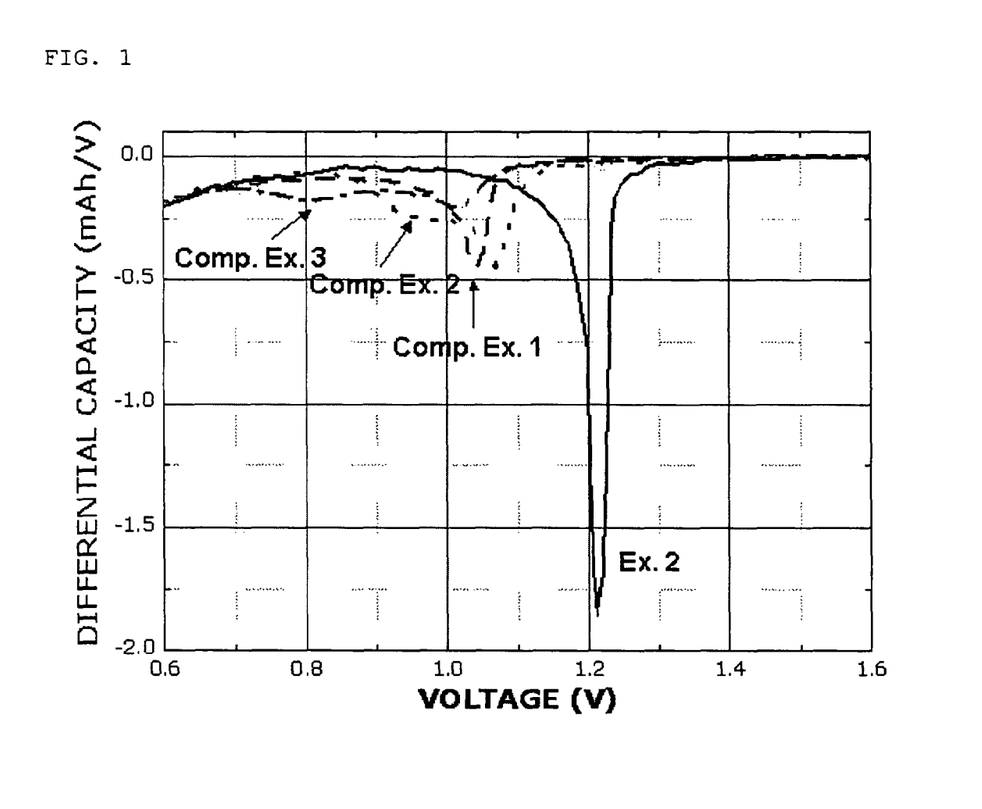
FIG. 1 is a graph showing the reduction potential of each of the electrolytes according to Example 2 and Comparative Examples 1~3, as measured by using half cells comprising the electrolytes.

Each of the coin-like half cells, obtained according to the conventional manner by using the electrolytes prepared in Example 2 and Comparative Examples 1~3, was discharged at 0.1 C. to 5 mV. Then, a dQ/dV plot was constructed based the results of the experiment. FIG. 1 shows the plot.

After the experiment, the half cell of Example 2 using a cyano group-containing sulfonate-based compound as a constitutional element of the electrolyte showed a reduction peak at a higher potential (a lower potential in the case of a full cell), when compared to the half cells according to Comparative Examples 1~3. Therefore, it can be seen from the above results that introduction of an electron withdrawing group (EWG) causes a change in the reduction potential of a sulfonate-based compound at the anode.

EXPERIMENTAL EXAMPLE 2

Determination of SEI Film Formed on Anode

The following test was performed to determine the formation of an SEI film from the sulfonate-based compound having an electron withdrawing group according to the present invention on the surface of an anode.

Figure 2:
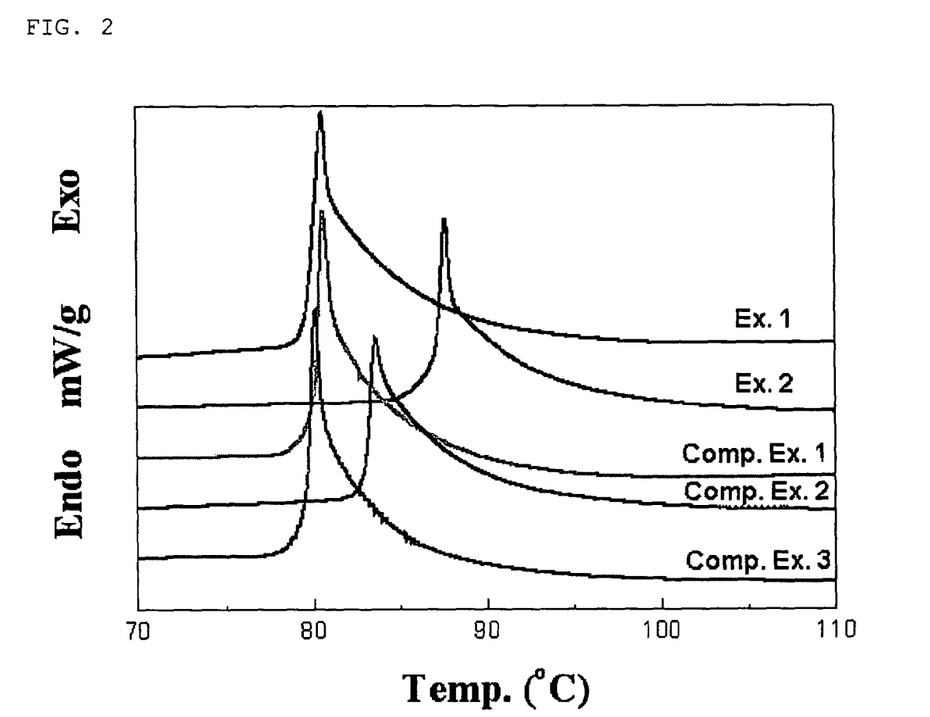
FIG. 2 is a graph showing the results of DSC (differential scanning calorimetry) of each of the anode active materials collected from the half cells according to Example 1, Example 2 and Comparative Examples 1~3, after they are subjected to charge/discharge cycles.

Each of the lithium secondary batteries (full cells) obtained from Examples 1 and 2, and Comparative Examples 1~3 was subjected to three charge/discharge cycles under 0.2 C. at 23° C., and then the anode was collected from each battery in a discharged state. The anode was analyzed by DSC (differential scanning calorimetry). The results are shown in FIG. 2. It is thought that the heat emission peak appearing in the range of 70~100° C. is the result of the thermal collapse of the SEI film on the surface of the anode.

As shown in FIG. 2, exothermic reaction behavior caused by the collapse of SEI on the surface of an anode varies depending on the kind of the additive for electrolytes. In addition, all of the above experimental results demonstrate that the additive for electrolytes according to the present invention participates in the formation of the SEI film on an anode.

EXPERIMENTAL EXAMPLE 3

Evaluation of High-Temperature Cycle Characteristics of Battery

The following test was performed to evaluate the quality of a lithium secondary battery according to the present invention.

The lithium secondary batteries (full cells) of Examples 1 and 2, comprising the cyano group-containing sulfonate-based compound as an additive for electrolytes were used as samples. As controls, the batteries of Comparative Examples 1~3, comprising the electrolyte comprising a sulfonate-based compound containing no cyano group as an additive, or the conventional electrolyte, were used. Each battery was subjected to repeated charge/discharge cycles under a temperature of 60° C. in a voltage range of 4.2V~3V at a current of 0.5 C.

Figure 3:
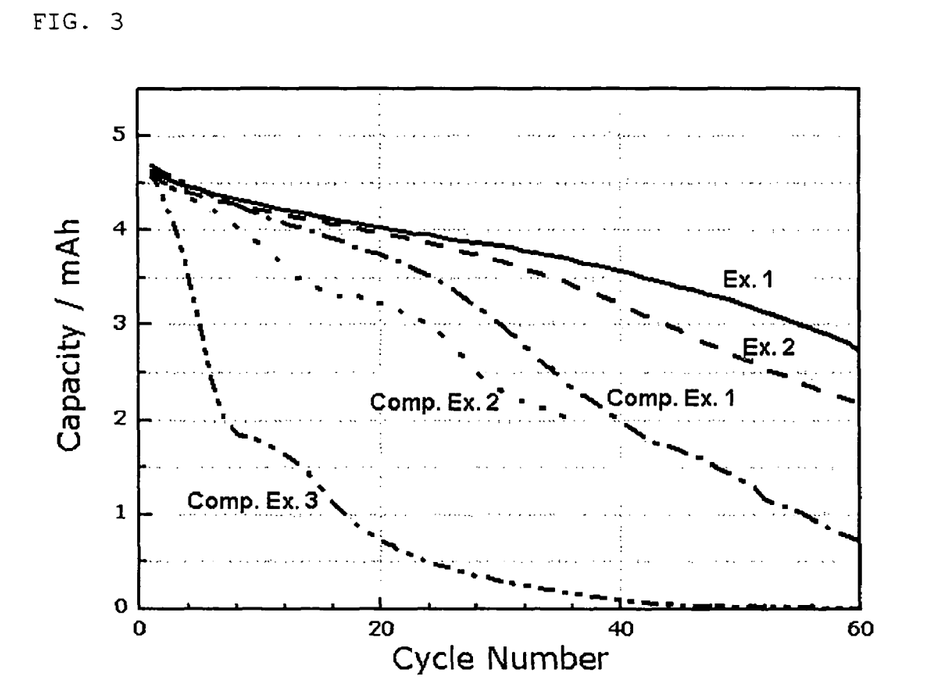
FIG. 3 is a graph showing the high-temperature (60° C.) characteristics of the lithium secondary batteries according to Example 1, Example 2 and Comparative Examples 1~3.

After the experiment, the battery using the conventional electrolyte according to Comparative Example 3 showed a significant drop in cycle characteristics after a few cycles. The battery using a sulfonate-based compound containing no cyano group according to Comparative Example 1 and the battery using a sulfonate-based compound having a cyano group but containing no alkenyl group according to Comparative Example 2 also showed a significant drop in cycle life characteristics (see FIG. 3). This indicates that when using the conventional sulfonate-based compound, it is not possible to form a passivation layer (SEI) to a sufficient degree. On the contrary, the batteries of Examples 1 and 2 using the cyano group-containing sulfonate-based compound as an additive for electrolytes show little drop in cycle life characteristics even after 60 cycles. The batteries of Examples 1 and 2 showed excellent cycle characteristics and improved lifespan characteristics at high temperature (see FIG. 3).

INDUSTRIAL APPLICABILITY

As can be seen from the foregoing, the lithium secondary battery according to the present invention, which uses a sulfonate-based compound having a specific electron withdrawing group as an additive for electrolytes, can provide significantly improved high temperature lifespan characteristics.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is;

1. An electrolyte for batteries, which comprises:
   (a) an electrolyte salt;
   (b) an electrolyte solvent; and
   (c) a sulfonate-based compound containing at least one electron withdrawing group (EWG) selected from the group consisting of a cyano group (—CN), an isocyanate group (—NCO), a thiocyanate group (—SCN) and an isothiocyanate group (—NCS), wherein the sulfonate-based compound is a compound represented by the following Formula I:

wherein $R_1$ is a C2~C10 alkenyl; and $R_2$ is a functional group selected from the group consisting of a C1~C10 alkyl group, alkenyl group, aryl group and phenyl group containing at least one substituent selected from a cyano group, an isocyanate group, a thiocyanate group and an isothiocyanate group.

2. The electrolyte according to claim 1, wherein the sulfonate-based compound performs an electrochemical reaction in the battery to form a passivation layer, and shows a decreased reduction potential due to the electron withdrawing group (EWG) introduced thereto.

3. The electrolyte according to claim 1, wherein the sulfonate-based compound is used in an amount of 0.1~10 parts by weight based on 100 parts by weight of the electrolyte.

4. An electrochemical device comprising a cathode, an anode, a separator, and the electrolyte as defined in claim 1, the electrolyte comprises:
(a) an electrolyte salt;
(b) an electrolyte solvent; and
(c) a sulfonate-based compound containing at least one electron withdrawing group (EWG) selected from the group consisting of a cyano group (—CN), an isocyanate group (—NCO), a thiocyanate group (—SCN) and an isothiocyanate group (—NCS), wherein the sulfonate-based compound is a compound represented by the following Formula I:

[Formula 1]

wherein R1 is a C2~C10 alkenyl; and $R_2$ is a functional group selected from the group consisting of a C1~C10 alkyl group, alkenyl group, aryl group and phenyl group containing at least one substituent selected from a cyano group, an isocyanate group, a thiocyanate group and an isothiocyanate group.

5. The electrochemical device according to claim 4, wherein the sulfonate-based compound performs an electrochemical reaction in the battery to form a passivation layer, and shows a decreased reduction potential due to the electron withdrawing group (EWG) introduced thereto.

6. The electrochemical device according to claim 4, which is a lithium secondary battery.

7. An electrode comprising a sulfonate-based compound or a chemical reaction product thereof, partially or totally formed on a surface thereof, wherein the sulfonate-based compound contains at least one electron withdrawing group (EWG) selected from a cyano group, an isocyanate group, a thiocyanate group and an isothiocyanate group, wherein the sulfonate-based compound is a compound represented by the following Formula I:

wherein R1 is a C2~C10 alkenyl; and $R_2$ is a functional group selected from the group consisting of a C1~C10 alkyl group, alkenyl group, aryl group and phenyl group containing at least one substituent selected from a cyano group, an isocyanate group, a thiocyanate group and an isothiocyanate group.

8. The electrode according to claim 7, which comprises a sold electrolyte interface (SEI) film partially or totally formed on the surface thereof via electrochemical reduction of the sulfonate-based compound.

9. The electrode according to claim 7, which comprises a complex-like protection layer formed via chemical bonding between a surface of an electrode active material and at least one substituent, contained in the sulfonate-based compound and selected from a cyano group, an isocyanate group, a thiocyanate group and an isothiocyanate group.

10. An electrochemical device comprising a cathode, an anode, a separator and an electrolyte, wherein either or both of the cathode and the anode are the electrodes as defined in claim 6, the electrode comprises a sulfonate-based compound or a chemical reaction product thereof, partially or totally formed on a surface thereof, wherein the sulfonate-based compound contains at least one electron withdrawing group (EWG) selected from a cyano group, an isocyanate group, a thiocyanate group and an isothiocyanate group, wherein the sulfonate-based compound is a compound represented by the following Formula I:

wherein R1 is a C2~C10 alkenyl; and
$R_2$ is a functional group selected from the group consisting of a C1~C10 alkyl group, alkenyl group, aryl group and phenyl group containing at least one substituent selected from a cyano group, an isocyanate group, a thiocyanate group and an isothiocyanate group.

11. The electrochemical device according to claim 10, wherein the electrode comprises a sold electrolyte interface (SEI) film partially or totally formed on the surface thereof via electrochemical reduction of the sulfonate-based compound.

12. The electrochemical device according to claim 10, wherein the electrode comprises a complex-like protection layer formed via chemical bonding between a surface of an electrode active material and at least one substituent, contained in the sulfonate-based compound and selected from a cyano group, an isocyanate group, a thiocyanate group and an isothiocyanate group.

* * * * *